US012722585B2

(12) United States Patent
Ma et al.

(10) Patent No.: US 12,722,585 B2
(45) Date of Patent: Sep. 1, 2026

(54) METHOD OF CONTROLLING VEHICLE MEMBER TO PERFORM OPERATION, ELECTRONIC APPARATUS, AND STORAGE MEDIUM

(71) Applicant: PATEO CONNECT+ Technology (Shanghai) Corporation, Shanghai (CN)

(72) Inventors: Bin Ma, Shanghai (CN); Guigui Lu, Shanghai (CN)

(73) Assignee: PATEO CONNECT+ Technology (Shanghai) Corporation, Shanghai (CN)

( * ) Notice: Subject to any disclaimer, the term of this patent is extended or adjusted under 35 U.S.C. 154(b) by 61 days.

(21) Appl. No.: 18/516,239

(22) Filed: Nov. 21, 2023

(65) Prior Publication Data

US 2024/0083374 A1 Mar. 14, 2024

Related U.S. Application Data

(63) Continuation of application No. PCT/CN2023/091962, filed on May 4, 2023.

(30) Foreign Application Priority Data

Jun. 8, 2022 (CN) ......................... 202210644516.4

(51) Int. Cl.

*B60R 16/037* (2006.01)
*B60Q 1/50* (2006.01)
*B60Q 3/80* (2017.01)
*B60R 1/07* (2006.01)

(Continued)

(52) U.S. Cl.

CPC .............. *B60R 16/037* (2013.01); *B60Q 1/50* (2013.01); *B60Q 3/80* (2017.02); *B60R 1/07* (2013.01); *B60S 1/08* (2013.01); *G06F 3/162* (2013.01)

(58) Field of Classification Search

CPC ........... B60R 16/037; B60R 1/07; B60Q 3/80; B60Q 1/50; B60S 1/08; G06F 3/162; B60K 35/28

See application file for complete search history.

(56) References Cited

U.S. PATENT DOCUMENTS

2021/0201664 A1* 7/2021 McQuillen ............. G08G 1/091

FOREIGN PATENT DOCUMENTS

AU 2013361099 A1 * 7/2015 ............. G10L 25/24
CN 109491283 A 3/2019
CN 109548249 A 3/2019

(Continued)

OTHER PUBLICATIONS

The World Intellectual Property Organization (WIPO) International Search Report for PCT/CN2023/091962 Aug. 22, 2023 5 Pages.

*Primary Examiner* — Kito R Robinson
*Assistant Examiner* — Erin Marie Hartmann
(74) *Attorney, Agent, or Firm* — Anova Law Group, PLLC

(57) ABSTRACT

A method of controlling a vehicle member to perform an operation includes, in response to a vehicle turning on an interaction mode according to a music scene, generating a control instruction used to control the vehicle member based on at least one of music information in the music scene or motion information of a person outside the vehicle, and based on the control instruction, controlling the vehicle member to perform the corresponding operation.

20 Claims, 3 Drawing Sheets

(51) Int. Cl.
*B60S 1/08* (2006.01)
*G06F 3/16* (2006.01)

(56) References Cited

FOREIGN PATENT DOCUMENTS

| | | | | | |
|---|---|---|---|---|---|
| CN | 109743812 | A | | 5/2019 | |
| CN | 110053441 | A | | 7/2019 | |
| CN | 110677837 | A | | 1/2020 | |
| CN | 111873742 | A | | 11/2020 | |
| CN | 112298017 | A | * | 2/2021 | ........... G06V 20/588 |
| CN | 112706707 | A | * | 4/2021 | ............. G10L 25/51 |
| CN | 114475411 | A | * | 5/2022 | ............. B60Q 1/076 |
| CN | 115476797 | A | | 12/2022 | |
| JP | 2013163493 | A | * | 8/2013 | ............. B60R 16/02 |

* cited by examiner

METHOD OF CONTROLLING VEHICLE MEMBER TO PERFORM OPERATION, ELECTRONIC APPARATUS, AND STORAGE MEDIUM

CROSS-REFERENCE TO RELATED APPLICATION

This application is a continuation of International Application No. PCT/CN2023/091962, filed on May 4, 2023, which claims priority to Chinese Patent Application No. 202210644516.4, filed on Jun. 8, 2022, the entire contents of which are incorporated herein by reference.

TECHNICAL FIELD

The present disclosure relates to the computer technology field and, more particularly, to a method of controlling a vehicle member to perform an operation, an electronic apparatus, and a storage medium.

BACKGROUND

Currently, the automobile industry is developed to become electrical, network-connected, sharing, and intelligent. With the enhancement of in-vehicle communication technology and sensor technology, a higher requirement is imposed on interaction experience between a vehicle and a person outside of the vehicle and a motion of a vehicle member accompanied by music.

At present, an interaction between the vehicle and the person outside the vehicle is still limited to simple controls, e.g., a user turns on or off the vehicle through a smart key, or the user turns on or off the vehicle or a member of the vehicle from outside of the vehicle through a cellphone client end. At present, a method that is suitable for the motion and interaction between some vehicle members, which has strong sensing, and music in an external environment and the person outside of the vehicle does not exist.

SUMMARY

Embodiments of the present disclosure provide a method of controlling a vehicle member to perform an operation. The method includes, in response to a vehicle turning on an interaction mode according to a music scene, generating a control instruction used to control the vehicle member based on at least one of music information in the music scene or motion information of a person outside the vehicle, and based on the control instruction, controlling the vehicle member to perform the corresponding operation.

Embodiments of the present disclosure provide an electronic apparatus, including at least a processor and a memory. The memory is communicatively coupled to the processor and stores an instruction that, when the instruction is executed by the processor, causes the processor to, in response to a vehicle turning on an interaction mode according to a music scene, generate a control instruction used to control the vehicle member based on at least one of music information in the music scene or motion information of a person outside the vehicle, and based on the control instruction, control the vehicle member to perform the corresponding operation.

Embodiments of the present disclosure provide a non-transitory computer-readable storage medium storing an instruction that, when executed by a machine, causes the machine to, in response to a vehicle turning on an interaction mode according to a music scene, generate a control instruction used to control the vehicle member based on at least one of music information in the music scene or motion information of a person outside the vehicle, and based on the control instruction, control the vehicle member to perform the corresponding operation.

DETAILED DESCRIPTION OF THE EMBODIMENTS

Figure 1:
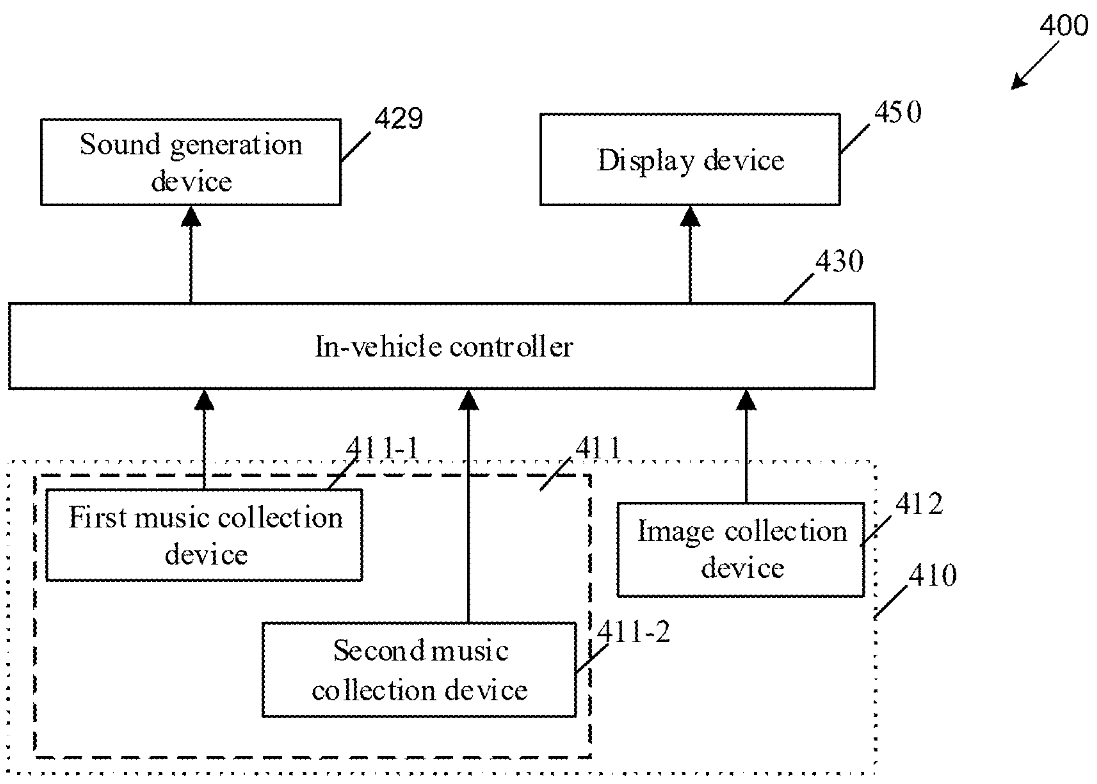
FIG. 1 is a schematic diagram of a vehicle motion control system according to some embodiments of the present disclosure.

The technical solutions of embodiments of the present disclosure are described in detail below with reference to the accompanying drawings of embodiments of the present disclosure. Apparently, the described embodiments are only some embodiments not all embodiments of the present disclosure. Based on embodiments in the present disclosure, all other embodiments obtained by those of ordinary skill in the art without creative work are within the scope of the present disclosure.

Embodiments described by references, such as "exemplarily," "in some embodiments," "optionally," and "as an option," in the specification can include a specific feature, structure, or characteristic. However, each embodiment may not include the specific feature, structure, or characteristic. In addition, these phrases do not necessarily refer to a same embodiment. In addition, when the specific feature, structure, or characteristic is described in connection with embodiments, whether explicitly described or not, implementation of the feature, structure, or characteristic in connection with other embodiments should be within the knowledge scope of those skilled in the art.

The terms "first," "second," etc., described in the present disclosure are used to distinguish similar objects and are not necessarily used to describe a specific sequence or order. Objects described in this manner can be interchanged in an appropriate situation. Thus, embodiments of the present disclosure can be implemented in another sequence in addition to those sequences described in the drawings or described here. Furthermore, the terms "comprising" and "having" and any variations thereof are intended to cover a non-exclusive inclusion. For example, a process, a method, and a product including a series of steps are not necessarily limited to those steps or product devices listed but can include other steps or devices not listed or inherent to the process, method, or product.

Figure 2:
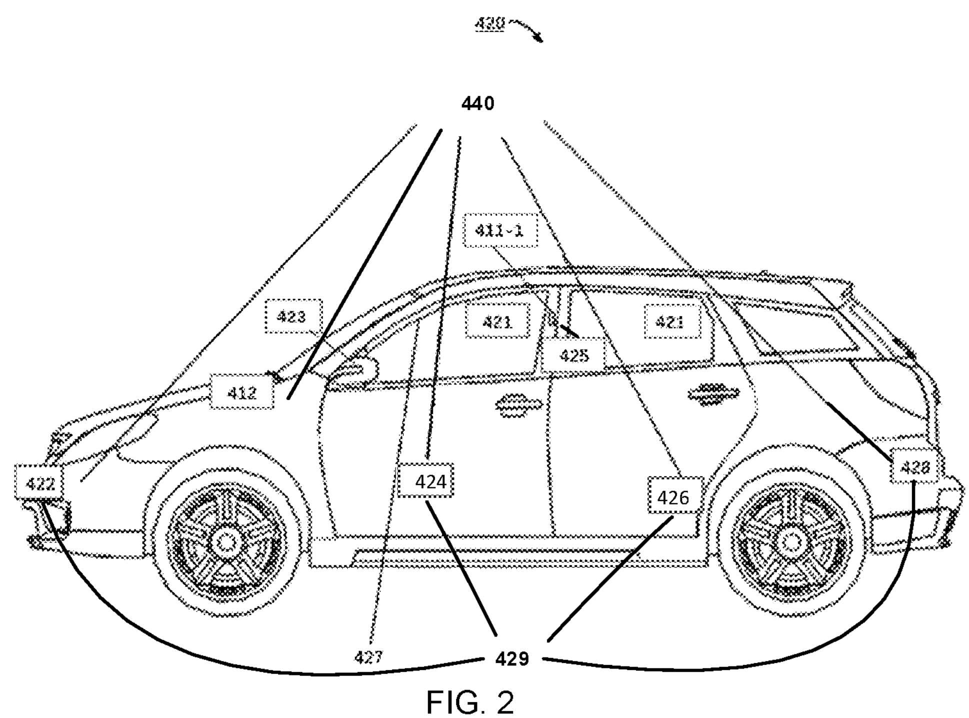
FIG. 2 is a schematic top view of a vehicle mounting with the vehicle motion control system according to some embodiments of the present disclosure.

FIG. 1 is a schematic diagram of a vehicle motion control system 400 according to some embodiments of the present disclosure. FIG. 2 is a schematic top view of a vehicle 420 mounting with the vehicle motion control system 400 according to some embodiments of the present disclosure.

As shown in FIGS. 1 and 2, the vehicle motion control system 400 includes one or more information collection devices 410. The information collection device 410 includes, for example, a music collection device 411 and an image collection device 412. In some embodiments, the music collection device 411 includes, for example, a first music collection device 411-1 arranged outside the vehicle 420 and/or a second music collection device 411-2 arranged inside the vehicle 420 (FIG. 2 illustrates an exemplary first music collection device 411-1). With reference to FIG. 2, the first music collection device 411-1 can be arranged at a B-pillar 425 between vehicle door windows 421 on a same side of the vehicle 420 or at a rearview mirror 423 of the vehicle 420. In some embodiments, the first music collection device 411-1 can be arranged inside the B-pillar 425 or inside the rearview mirror 423. the first music collection device 411-1 can be configured to receive a music input from the outside of the vehicle 420. The second information collection device 411-2 can be arranged at a steering wheel (not shown) inside the vehicle 420 and configured to receive the music input inside the vehicle 420. The first music collection device 411-1 and the second music collection device 411-2 can include, for example, a microphone. When the vehicle 420 is in a music scene outside the vehicle or a music scene inside the vehicle, the information collection device 410 can be configured to collect music information (e.g., beat information or music content) for the music scene.

The above music scene can include at least one sound scene that can be accompanied by people dancing among park dance, a bonfire party, a dance with music, a party, music played in camping, and music played by a player in the vehicle.

The above music scene can also include a specially created atmosphere scene. For example, a festival atmosphere, a birthday atmosphere, etc. Based on a specific festival, a festival-themed party can be constructed. Further, based on a boyfriend or girlfriend birthday, anniversaries, etc., a birthday theme party or music atmosphere can be constructed.

When the above music scene is constructed based on the vehicle motion system, construction timing can be controlled to achieve a surprising effect for a specific user, such as a birthday surprise mode.

In some embodiments, the image collection device 412 can be arranged on an outer side of a vehicle body panel 440 of the vehicle 420. For example, the image collection device 412 can be arranged near a front window glass of the vehicle 420 or inside the rearview mirror 423 of the vehicle 420. A cover covering the image collection device 412 can have a certain degree of transparency and light transmission. In some embodiments, the above image collection device 412 can be, for example, a time of flight (TOF) sensor device. For example, when the image collection device 412 is the TOF sensor device (e.g., a TOF camera), the TOF camera can capture an image including user motion information in a music scene outside the vehicle.

In some embodiments, the vehicle motion control system 400 can further include an in-vehicle controller 430 configured to generate a control instruction based on at least one of the music information in the music scene and the user motion information outside the vehicle when the vehicle 420 is in an interaction mode. The in-vehicle controller 430 can be further configured to control some members of the vehicle 420 to perform a corresponding operation according to the control instruction to realize vehicle motion accompanied by music or the interaction between the vehicle and the user outside of the vehicle. In some embodiments, when the music information includes beat information, the in-vehicle controller 430 can receive the beat information, analyze a beat tempo in the beat information, and control the members to perform motion matching the members in a certain dynamic mode according to, e,g., a tempo corresponding to the beat tempo to realize a certain dynamic effect.

In other embodiments, the music information can include the beat information. The in-vehicle controller 430 can receive the beat information and determine whether beats corresponding to time periods match predetermined beats. When the beats corresponding to one or some time periods match the predetermined beats, the members of the vehicle 420 can be controlled to perform motions matching with the members in a certain dynamic mode during the time period corresponding to the beats. For example, the predetermined beats and the corresponding information of the control instruction can be, e.g., defined by the user and pre-stored at a server end. The in-vehicle controller 430 can perform matching on the received beats corresponding to the time periods with the beats pre-stored at the server end. The in-vehicle controller 430 can further return a control instruction corresponding to matched predetermined beats at the server end back to the in-vehicle controller 430. The in-vehicle controller 430 can control the members of the vehicle 420 to perform the motions matching the members in the certain dynamic mode during the time period corresponding to the beats based on the control instruction.

In some embodiments, the vehicle motion control system 400 can further include a plurality of members that have strong user sensing of the vehicle 420 performing the motions. In some embodiments, the members of the vehicle 420 that performs the motions can include at least one of a pair of wipers, a rearview mirror, a wheel, vehicle exterior lights, interior ambient lights, or a display device. The exemplary listed members are not shown in the vehicle 420 shown in FIG. 2 for the brevity of the drawings. In some scenes, the in-vehicle controller 430 controlling the members to perform the corresponding motions according to, e.g., at the tempo corresponding to the beat tempo can include at least one of controlling the pair of wipers to swing at the tempo corresponding to the beat tempo, the rearview mirror to open and close at the tempo corresponding to the beat tempo, the wheel to rotate at the tempo corresponding to the beat tempo, the vehicle exterior lights to flash at the tempo corresponding to the beat tempo, or the interior ambient lights to adjust colors at the tempo corresponding to the beat tempo.

In some other scenes, the in-vehicle controller 430 controlling the above members to perform the corresponding motions during, for example, the time period corresponding to the beats can include at least one of controlling the pair of wipers to swing during the time period corresponding to the beats, the rearview mirror to open and close during the time period corresponding to the beats, the wheel to rotate during the time period corresponding to the beats, the vehicle exterior lights to flash during the time period corresponding to the beats, or the interior ambient lights to adjust colors during the time period corresponding to the beats.

In some embodiments, after obtaining the image including the motion information of the person outside the vehicle, the image collection device 412 can transmit the image to the in-vehicle controller 430. The in-vehicle controller 430 can perform recognition on the motion information included in the image and control the members of the vehicle to perform the corresponding operation according to a recognition result. In some embodiments, the image collection device 412 can convert the recognized image including attitude information or trajectory information of the person outside the vehicle into an electrical signal and transmit the electrical signal to the in-vehicle controller 430. The in-vehicle controller 430 can determine whether the person outside the vehicle is dancing based on the electrical signal. Further, the in-vehicle controller 430 can determine a specific dance move of the person outside of the vehicle. After determining that the person outside of the vehicle is dancing or the specific dance move, the in-vehicle controller 430 can generate the control instruction to control the members to perform the motions matching the members. In a specific application scene, the members can include at least one of a pair of wipers, a rearview mirror, a wheel, or vehicle exterior lights. The in-vehicle controller 430 controlling the members to perform the motions matching the members according to the attitude information or trajectory information of the person outside of the vehicle can include controlling the pair of wipers to swing, the rearview mirror to open and close, the wheel to turn to the left or right, or left lights and right lights of the vehicle exterior lights to correspondingly flash after determining that the person outside of the vehicle performs the dance move of raising hands alternatively.

In some embodiments, the members of the vehicle 420 that perform the motions can include, for example, one or more sound generation devices 429 (FIG. 2 illustrates an exemplary sound generation device 429). A sound generation device 429 can be arranged on an inner side of the vehicle body panel 440, which is used as an outer surface of the vehicle 420, or on an inner side of an interior panel 427, which is used as an inner surface of the vehicle 420. As shown in FIG. 2, the sound generation devices 429 are arranged at any one or more places of a front side 422, a front door 424, a rear door 426, and a rear side 428 of the vehicle 420. In some embodiments, the sound generation device 429 can be symmetrically arranged on both sides of the vehicle 420.

In some embodiments, the above sound generation device 429 can include, for example, at least one of a piezoelectric sound generation device, an external speaker, or an electromagnetic induction sound generation device. Taking the piezoelectric sound generation device as an example, in some application scenes, after receiving, for example, the beat information, the in-vehicle controller 430 can output a beat signal to the piezoelectric sound generation device to cause the piezoelectric sound generation device to vibrate the vehicle body panel 440 under the excitation of the beat signal to emit a sound toward the outside of the vehicle 420. In some other application scenes, after determining that the person outside of the vehicle is dancing and the specific dance move, the in-vehicle controller 430 can control the sound generation device 429 to emit a sound (e.g., a cheering sound) to the outside of the vehicle 420.

In some embodiments, the members of the vehicle 420 that perform the motions can further include, for example, a display device 450. For example, the display device can include a head-up display (HUD). Thus, a to-be-displayed image can be displayed at, for example, the front windshield glass of the vehicle 420. In some embodiments, the music information can include music content. The music content can include, for example, a song played by the player inside the vehicle 420 or a song in the external environment of the vehicle. The in-vehicle controller 430 can recognize the music content collected by the information collection device 410 and control the display device 450 based on the recognition result. Thus, the display device 450 can display a corresponding image. In some application scenes, the in-vehicle controller 430 can, for example, perform semantic recognition on the music content collected by the music collection device 411 and generate the control instruction according to the recognized scene semantic to control the display device 450 to display the corresponding scene image according to the scene semantic. The above scene semantics can include, for example, weather information such as sunshine, rain, snow, and wind, and can also include separation, meet, and festival information.

In some embodiments, the above display device 450, for example, can further include a holographic projector. In some application scenes, the music collection device 411 can collect lyric information of the music content. The in-vehicle controller 430 can, for example, match the collected lyric information with a predetermined song library and, after matching a predetermined song, generate a control instruction corresponding to the predetermined song. Thus, the in-vehicle controller 430 can control the display device 450 to display a virtual portrait related to the predetermined song. In some embodiments, the virtual portrait related to the predetermined song can include, for example, a virtual portrait of the author of the predetermined song. The virtual portrait related to the author can be realized through virtual portrait technology (e.g., including real-time motion capturing, virtual digital modeling, and audio synthesis). In some embodiments, when the predetermined song is a duet song, the duet singing of the virtual portrait and the person outside of the vehicle can be realized in connection with the virtual portrait technology.

In some embodiments, the display device 450, for example, can further include at least one of vehicle headlights or taillights with a projection function. The vehicle headlights or taillights with the projection function can carry digital light processing (DLP) technology. Thus, the vehicle headlights or taillights can project a colored image. In some application scenes, the in-vehicle controller 430, for example, can control the display device 450 to adjust the color of the image projected by the display device 450 according to the beat information collected by the music collection device 411.

Figure 5:
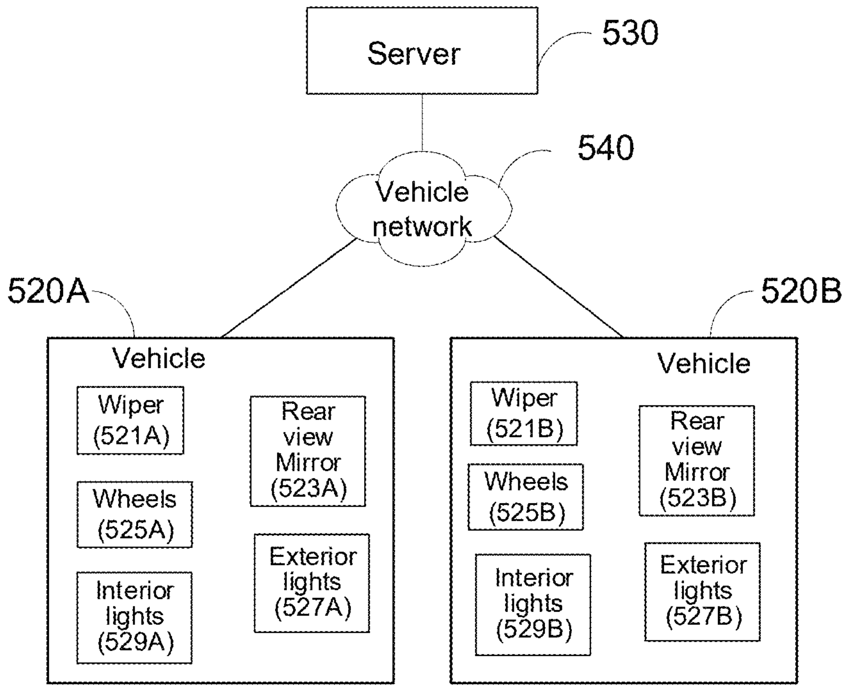
FIG. 5 is a schematic block diagram illustrating two vehicles connected to a server according to some embodiments of the present disclosure.

In an example including at least two vehicles, for example, a vehicle 520A and another vehicle 520B, as shown in FIG. 5, member information of the vehicles can be determined by obtaining vehicle configuration information of the at least two vehicles. In some embodiments, the vehicle configuration information pre-stored at server end 530 can be called through a vehicle network 540. A user guidance program that is pre-installed at the vehicle 520A can be started to guide the user to perform selection and configuration. The selection, for example, can include a selection of a primary control vehicle, e.g., the vehicle 520A and a selection of at least a same member of the vehicles 520A and 520B that performs the motion. The specific configuration can be performed on the vehicles based on the selection result. In some embodiments, the same member included in the at least two vehicles can include at least one pair of wipers 521A and 521B, rearview mirrors 523A and 523B, wheels 525A and 525B, vehicle exterior lights 527A and 527B, or vehicle interior ambient lights 529A and 529B.

In some embodiments, the at least two vehicles can carry communication modules. The communication modules can implement communication connection of the at least two vehicles based on at least one of Wifi, Bluetooth, Starlight, and cellular mobile communication technologies. In some embodiments, the current vehicle 420 can be used as the primary control vehicle. The primary control vehicle 420 can, based on the communication connection established by the primary control vehicle 420 with at least another vehicle (e.g., a slave control vehicle), transmit the control instruction of the corresponding same member generated by the primary control vehicle 420 synchronously to at least another vehicle. Thus, the in-vehicle controllers of the at least two vehicles can control the at least two vehicles to perform the same operation synchronously to realize synchronous interaction of a plurality of vehicles. The same operation described here can include, for example, the specific operation in any member of the control system 400 described above in embodiments of the present disclosure, which is not repeated here.

In some embodiments, the current vehicle 420 can be used as the primary control vehicle. In addition to the user performing the selection on the at least one same member of the vehicles that performs the motion, the user can further perform delay setting on time of the control instruction used to control the at least one same member of the slave control vehicle (e.g., at least another vehicle). In some embodiments, based on the communication connection established between the current vehicle 420 and the at least another vehicle, the time at which the current vehicle 420 and the at least another vehicle can control the same members of the vehicles to receive the same control instruction can be different. The in-vehicle controllers of the at least two vehicles can control the same members of the vehicles to perform the same operation at the times the vehicles of receiving the same control instructions, respectively. That is, at least one vehicle can be delayed to perform the control instruction to realize interactions of the plurality of vehicles in sequence. The same operation described here can include the specific operation of any one member in the control system 400 described above, which is not repeated here.

In some other embodiments, the current vehicle 420 can be used as the primary control vehicle. The user can perform different selections on the members of the vehicles that perform the motion (e.g., the current vehicle 420 selects the sound generation device 429, and the other vehicle selects the display device 450). In addition, the current vehicle 420 and the another vehicle can control the in-vehicle controllers of the current vehicle 420 and the another vehicle to generate different control instructions to control the different members of the vehicles to perform different operations according to the control instructions corresponding to the current vehicle 420 and the another vehicle. Thus, the interaction of the plurality of vehicles can be improved. The different operations described here can be, for example, the specific operations of any two different members of the plurality of members in the control system 400 of embodiments of the present disclosure, which are not repeated here.

The vehicle motion control system 400 of some embodiments of the present disclosure can realize the interaction between some members of the vehicle having strong user experience and the person or music outside the vehicle in a single-vehicle mode. The vehicle motion control system 400 can also realize synchronous motions or asynchronous motions in a multi-vehicle mode. Thus, more vehicle motions and human-machine interactions can be realized to improve technology feel and fun of the human-machine interaction.

Figure 3:
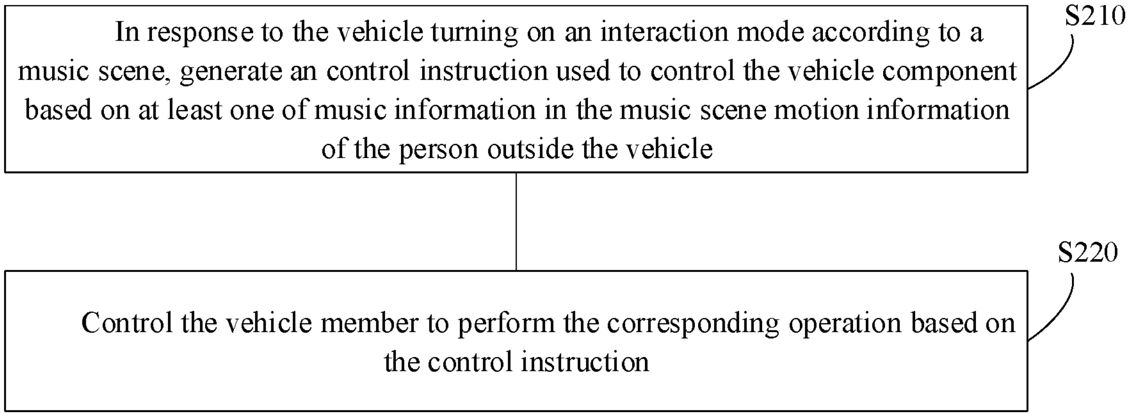
FIG. 3 is a schematic flowchart of a method of controlling a vehicle member to perform an operation according to some embodiments of the present disclosure.

Embodiments of the present disclosure also provide a method 200 of controlling the vehicle member to perform an operation. FIG. 3 is a schematic flowchart of the method 200 of controlling the vehicle member to perform the operation according to some embodiments of the present disclosure. The method 200 includes, in response to the vehicle turning on an interaction mode according to a music scene, generating a control instruction used to control the vehicle member based on at least one of the music information in the music scene and the motion information of the person outside of the vehicle (S210), and controlling the vehicle member to perform the corresponding operation based on the control instruction (S220).

The sequence of the steps illustrates in embodiments of the present disclosure is only one of a plurality of execution sequences of the steps and is not the only execution sequence. In an actual operation, the method can be executed according to the method sequence of embodiments of the present disclosure or in parallel. In some embodiments, the steps shown in the method 200 of controlling the vehicle member to perform the operation are not exhaustive. Other steps can be performed before, after, or between the described method, which are not limited to the present disclosure.

The method 200 of controlling the vehicle member to perform the operation of the present disclosure is described in detail below in connection with FIGS. 1 to 4. As shown in FIG. 3, the vehicle turning on the interaction mode according to the music scene includes the vehicle receiving an interaction request in the music scene and turning on the interaction mode. The above music scene can include, for example, at least one sound scene that can be accompanied by people dancing among park dance, a bonfire party, a dance with music, a party, music played during camping, and music played by a player in the vehicle. In some embodiments, the above music scene, for example, can further include a sound scene in which the in-vehicle player plays music. Taking the vehicle 420 above as an example, when the vehicle 420 is in the sound scene, an interaction request can be sent to the vehicle 420 based on at least one of the music information or the human motion information in the music scene for the vehicle owner to confirm the request. In some embodiments, the interaction request, for example, can be transmitted to a mobile end connected to the vehicle network through the vehicle 420, which facilitates the user to confirm whether the interaction mode is turned on at any time. In some other embodiments, the music scene can include a noise environment, not an interaction environment, in which the user wants to participate. When the vehicle receives the interaction request, the user can choose not to turn on the interaction mode. Through the processing method, the noise environment can be effectively avoided. The user can flexibly select the timing of entering the interaction mode to improve the user experience of the interaction.

In some embodiments, the information collection device 410 of the vehicle motion control system 400 can collect at least one of the music information in the music scene or the motion information of the person outside the vehicle. In some embodiments, the music collection device 411 of the information collection device 410 can collect the music information (e.g., the beat information or music content). In some embodiments, the image collection device 412 of the information collection device 410 can collect the image including the motion information of the person outside of the vehicle. Further, the first music collection device 411-1 can collect the music information of the vehicle 420 in the music scene outside of the vehicle and/or the second music collection device 411-2 can collect the music information of the vehicle 420 in the music scene inside the vehicle.

In some embodiments, the in-vehicle controller 430 can receive at least one of the music information collected by the music collection device 411 or the motion information collected by the image collection device 412. The in-vehicle controller 430 can generate the control instruction used to control the vehicle member according to at least one of the music information or the motion information. At step S220, the related member of the vehicle 420 can be controlled to perform the corresponding operation based on the control instruction to realize the motion of the vehicle 420 accompanied by the music or the interaction between the vehicle 420 and the person outside of the vehicle.

In some embodiments, the music information can include the beat information. The in-vehicle controller 430 can receive the beat information, analyze the beat tempo of the beat information, and generate the control instruction related to the beat tempo and the vehicle member. The control instruction can be used to control the member of the vehicle 420 to perform the motions matching the member according to, for example, the tempo corresponding to the beat tempo in a certain dynamic mode.

In some other embodiments, the music information can include the beat information. The in-vehicle controller 430 can receive the beat information and determine whether the beats corresponding to the time periods match predetermined beats. When the beats corresponding to one or some time periods match the predetermined beats, the members of the vehicle 420 can be controlled to perform motions matching with the members in a certain dynamic mode during the time period corresponding to the beats. For example, the predetermined beats and the corresponding information of the control instruction can be, e.g., defined by the user and pre-stored at a server end. The in-vehicle controller 430 can perform matching on the received beats corresponding to the time periods with the beats pre-stored at the server end. The in-vehicle controller 430 can further return a control instruction corresponding to matched predetermined beats at the server end back to the in-vehicle controller 430. The in-vehicle controller 430 can control the members of the vehicle 420 to perform the motions matching the members in a certain dynamic mode during the time period corresponding to the beats based on the control instruction.

In some other embodiments, the music information can include the beat information. The in-vehicle controller 430 can receive the beat information collected by the music collection device 410 and generate the control instruction related to the beats and the sound generation device 429. Thus, the sound generation device 429 can be controlled to emit a sound to the outside of the vehicle 420.

In some embodiments, the music information can include the beat information. The in-vehicle controller 430 can control at least one vehicle member of the pair of wipers, the rearview mirror, the wheel, the vehicle exterior lights, the vehicle interior ambient lights, and the display device to perform at least one corresponding motion according to, e.g., the tempo corresponding to the beat tempo of controlling the pair of wipers to swing at the tempo corresponding to the beat tempo, the rearview mirror to open and close at the tempo corresponding to the beat tempo, the wheel to rotate at the tempo corresponding to the beat tempo, the vehicle exterior lights to flash at the tempo corresponding to the beat tempo, or the interior ambient lights to adjust colors at the tempo corresponding to the beat tempo.

In some other scenes, the music information can include the beat information. The in-vehicle controller 430 can control the at least one vehicle member of the pair of wipers, the rearview mirror, the wheel, the vehicle exterior lights, the vehicle interior ambient lights, and the display device to perform at least one corresponding motion according to, e.g., the tempo corresponding to the beat tempo of controlling the pair of wipers to swing during the time period corresponding to the beats, the rearview mirror to open and close during the time period corresponding to the beats, the wheel to rotate during the time period corresponding to the beats, the vehicle exterior lights to flash during the time period corresponding to the beats, or the interior ambient lights to adjust colors during the time period corresponding to the beats.

In still some other scenes, the music information can include the beat information. The in-vehicle controller 430 can receive the beat information collected by the music collection device 411 and generate the control instruction corresponding to the beat information and the above display device 450 (for example, the headlights or taillights of the vehicle that have the projection function. Thus, the display device 450 can be controlled to adjust the color of the projected image.

In some embodiments, the music information can include the music content. The music content, for example, can be the song played by the player inside the vehicle 420 or a song in the external environment of the vehicle. The in-vehicle controller 430 can recognize the music content collected by the information collection device 410 and control the vehicle member (e.g., the display device 450) to perform the operation based on the recognition result. For example, the display device 450 can be controlled to display the image corresponding to the recognition result. In some application scenes, the in-vehicle controller 430 can, for example, perform semantic recognition on the music content collected by the music collection device 411 and generate the control instruction according to the recognized scene semantic to control the display device 450 (e.g., HUD device) to display the corresponding scene image according to the scene semantic. The above scene semantics can include, for example, weather information such as sunshine, rain, snow, and wind, and can also include separation, meet, and festival information.

In some other embodiments, the music information can include the music content. Lyric information in the music content can be collected by the music collection device 411. The in-vehicle controller 430 can perform matching on the collected lyric information and the music library and generate the control instruction corresponding to the predetermined song after the predetermined song is matched. Thus, the display device 450 (e.g., a holographic projection device) can display the virtual portrait related to the predetermined song. In some embodiments, the virtual portrait related to the predetermined song can be the virtual portrait of the author of the predetermined song. The virtual portrait related to the author can be realized through the virtual portrait technology (e.g., including real-time motion capturing, virtual digital modeling, and audio synthesis). In some embodiments, when the predetermined song is the duet song, the duet singing of the virtual portrait and the person outside of the vehicle can be realized in connection with the virtual portrait technology.

In some embodiments, after obtaining the image including the motion information of the person outside the vehicle, the image collection device 412 can transmit the image to the in-vehicle controller 430. The in-vehicle controller 430 can perform recognition on the motion information included in the image and control the members of the vehicle to perform the corresponding operation according to a recognition result. In some embodiments, the image collection device 412 can convert the recognized image including attitude information or trajectory information of the person outside the vehicle into an electrical signal and transmit the electrical signal to the in-vehicle controller 430. The in-vehicle controller 430 can determine whether the person outside the vehicle is dancing based on the electrical signal. Further, the in-vehicle controller 430 can determine a specific dance move of the person outside of the vehicle. After determining that the person outside of the vehicle is dancing or the specific dance move, the in-vehicle controller 430 can generate the control instruction to control the members to perform the motions matching the members.

In the application scene, the vehicle member can include at least one of the pair of wipers, the rearview mirror, the wheel, or the vehicle exterior lights. The in-vehicle controller 430 controlling the member to perform the motions matching the member according to the attitude information or the trajectory information of the person outside of the vehicle can include at least one of controlling the pair of wipers to swing, the rearview mirror to open and close, the wheel to turn to the left or right, or left lights and right lights of the vehicle exterior lights to correspondingly flash after determining that the person outside of the vehicle performs the dance move of raising hands alternatively.

In a specific application scene, the vehicle member can include the sound generation device 429. The in-vehicle controller 430 can receive the electrical signal converted from the image including the motion information of the person outside of the vehicle collected by the image collection device 420. The in-vehicle controller 430 can determine that the person outside the vehicle is dancing or the specific dance move according to the electrical signal. The in-vehicle controller 430 can then generate the control instruction related to the motion information and the sound generation device 429. Thus, the sound generation device 429 can be controlled to emit the sound to the outside of the vehicle 420 (e.g., emit a cheering sound).

In some embodiments, at least two vehicles can be included. The member information of the vehicles can be determined by obtaining the vehicle configuration information of the at least two vehicles. In some embodiments, the vehicle configuration information pre-stored at the server end can be called through the vehicle network. A user guidance program that is pre-installed in the vehicle can be started to guide the user to perform selection and configuration. The selection, for example, can include the selection of the primary control vehicle and the selection of the at least a same member of the vehicles that performs the motion. The specific configuration can be performed on the vehicles based on the selection result. In some embodiments, the same member included in the at least two vehicles can include at least one of the pair of wipers, the rearview mirror, the wheel, the vehicle exterior lights, or the vehicle interior ambient lights.

In some embodiments, the current vehicle 420 can be used as the primary control vehicle. Based on the communication connection established by the communication module of the primary control vehicle 420 and the communication module of the at least another vehicle (e.g., the slave control vehicle), the primary control vehicle 420 can transmit the control instruction of the corresponding same member generated by the primary control vehicle 420 synchronously to at least another vehicle. Thus, the in-vehicle controllers of the at least two vehicles can control the at least two vehicles to perform the same operation synchronously to realize the synchronous interaction of the plurality of vehicles. The same operation described here can include, for example, the specific operation in any member of the control system 400 and the method 200 described above in embodiments of the present disclosure, which is not repeated here.

In some other embodiments, the current vehicle 420 can be used as the primary control vehicle. In addition to that the user performs the selection on the at least one same member of the vehicles that performs the motion, the user can further perform delay setting on time of the control instruction used to control the at least one same member of the slave control vehicle (e.g., at least another vehicle). In some embodiments, based on the communication connection established between the current vehicle 420 and the at least one another vehicle, the time at which the current vehicle 420 and the at least another vehicle can control the same members of the vehicles to receive the same control instruction can be different. The in-vehicle controllers of the at least two vehicles can control the same members of the vehicles to perform the same operation at the times the vehicles of receiving the same control instructions, respectively. That is, at least one vehicle can be delayed to perform the control instruction to realize interactions of the plurality of vehicles in sequence. The same operation described here can include the specific operation of any one member in the control system 400 described above, which is not repeated here.

In some other embodiments, the current vehicle 420 can be used as the primary control vehicle. The user can perform different selections on the members of the vehicles that perform the motion (e.g., the current vehicle 420 selects the sound generation device 429, and the another vehicle selects the display device 450). In addition, the current vehicle 420 and the another vehicle can control the in-vehicle controllers of the current vehicle 420 and the another vehicle to generate different control instructions to control the different members of the vehicles to perform different operations according to the control instructions corresponding to the current vehicle 420 and the another vehicle. Thus, the interaction of the plurality of vehicles can be improved. The different operations described here can be, for example, the specific operations of any two different members of the plurality of members in the control system 400 of embodiments of the present disclosure, which are not repeated here.

In the method of controlling the vehicle member to perform the operation of embodiments of the present disclosure, the interaction between the members with strong user experience and the person or the music outside the vehicle in a single vehicle mode. Synchronous motion or asynchronous motion can be realized in the multi-vehicle mode. Thus, the human-machine interaction of the vehicle motion can be enriched. The sense of technology and fun of the human-machine interaction can be improved.

Figure 4:
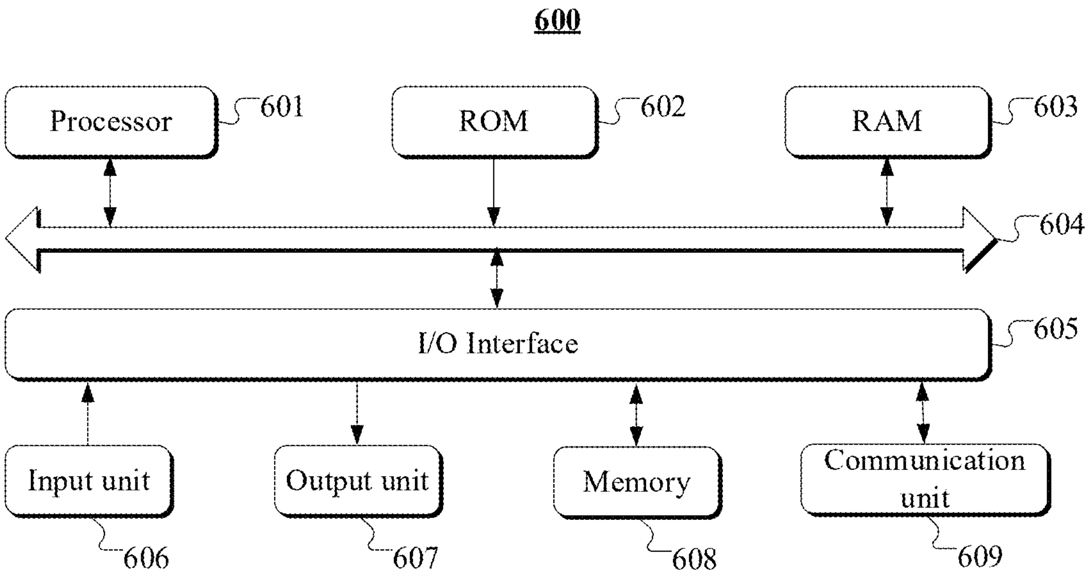
FIG. 4 is a schematic block diagram of an electronic apparatus configured to perform a method of controlling a vehicle member to perform an operation according to some embodiments of the present disclosure.

Embodiments of the present disclosure also provide an electronic apparatus and a non-transitory computer-readable storage medium used to control the vehicle member to perform the operation. FIG. 4 is a schematic block diagram of an electronic apparatus 600 configured to perform the method of controlling the vehicle member to perform the operation according to some embodiments of the present disclosure. The electronic apparatus can be intended to represent various forms of digital computers that can execute computer program instructions. The electronic apparatus can also represent various forms of mobile devices capable of implementing embodiments of the present disclosure. The members shown herein, the connection and relationship of the members, and the functions of the members can only show as an example and are not intended to limit the implementations of the present disclosure described and/or required in the connections and relationships, and their functions are by way of example only, and are not intended to limit implementations of the application described and/or claimed herein.

As shown in FIG. 4, the electronic apparatus 600 includes a processor 601. The processor 601 can be configured to perform various suitable motions and processing according to the computer program stored in the read-only-memory (ROM) 602 or the computer program that is loaded in the random access memory (RAM) 603. Various programs and data needed for the operation of the electronic apparatus 600 can be stored in ROM 603. The processor 601, the ROM 602, and the RAM 603 can be connected to each other through a bus 604. An I/O interface (input/output interface) 605 can be also connected to the bus 604.

In some embodiments, a plurality of processors 601 and/or a plurality of buses 604 can be used with a plurality of memories 608 as needed. Similarly, a plurality of electronic apparatuses 600 can be connected. The electronic apparatuses 600 can provide necessary operations.

A plurality of members of the electronic apparatus 600 can be connected to the I/O interface 605 and can include an input unit 606, e.g., a touch screen or another input knob, etc., an output unit 607, e.g., various types of displays, speakers, etc., and a memory 608, e.g., a disk etc., and a communication unit 609, e.g., a network card, a modem, a wireless communication transceiver, etc. The communication unit 609 can allow the apparatus 600 to exchange information/data with another apparatus through a computer network such as the Internet and/or various telecommunication networks.

The processor 601 can include various general-purpose and/or special-purpose processing assemblies having processing and computing capabilities. Some examples of the processor 601 can include, but are not limited to, a central processing unit (CPU), a graphics processing unit (GPU), various specialized artificial intelligence (AI) computing chips, various processors that run machine learning model algorithms, a digital signal processor (DSP), and any suitable processor, controller, microcontroller, etc. The processor 601 can perform the various methods described above, such as the methods of controlling the vehicle member to perform the operation. For example, in some embodiments, the method of controlling the vehicle member to perform the operation can be implemented as a computer software program tangibly embodied on a readable storage medium, such as memory 608. In some embodiments, a part or all of the computer program can be loaded and/or installed on the electronic apparatus 600 via the ROM 602 and/or the communication unit 609. When the computer program is loaded into the RAM 603 and executed by the processor 601, one or more steps of the above-described method of controlling the vehicle member to perform the operation can be performed. In some other embodiments, the processor 601 can be configured to perform the method of controlling the vehicle member to perform the operation in any other suitable manner (e.g., with firmware).

Various embodiments of the systems and technology described above can be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), computer hardware, firmware, software, and/or a combination thereof. These embodiments can be implemented in one or more computer programs. The one or more computer programs can be executed and/or explained in the programable system including at least one programmable processor. The programmable processor can be specialized or generalized programmable processor and can receive data and instructions from the storage system, the at least one input device, and at least one output device and transmit the data and the instructions to the storage system, the at least one input device, and the at least one output device.

Program codes used to implement the method of the present disclosure can be written in any combination of one or more programming languages. The above program codes can be packaged into a computer program product. The program codes or computer program products can be provided to a processor or a controller of a general-purpose computer, a special-purpose computer, or another programmable data processing apparatus. Thus, the program codes, when executed by the processor 601, cause the functions/operations defined in the flowcharts and/or block diagrams to be implemented. The program codes can be executed entirely on the machine, partially on the machine, partially on the machine and partially on a remote machine as a stand-alone software package or entirely on the remote machine or server.

In the context of the present disclosure, a non-transitory computer-readable storage medium can be a tangible medium that contains or stores a program for an instruction execution system, device, or apparatus to use or used in connection with the instruction execution system, device, and apparatus. A non-transitory computer-readable storage medium can be a machine-readable signal storage medium. The readable storage medium can include, but is not limited to, electronic, magnetic, optical, electromagnetic, infrared, or semiconductor systems, devices, or apparatuses, or any suitable combination thereof. More specific examples of the readable storage medium can include one or more wire-based electrical connections, portable computer disks, hard disks, random access memory (RAM), read-only memory (ROM), erasable programmable read-only memory (EPROM or flash memory), fiber optics, compact disk read-only memory (CD-ROM), optical storage apparatuses, magnetic storage apparatuses, or any suitable combination thereof.

The purpose, technical solutions, and beneficial effects of the present disclosure are further described in detail according to embodiments of the present disclosure. The above descriptions are only specific embodiments of the present disclosure and are not intended to limit the present disclosure. Any modification, equivalent replacement, improvement, etc. made within the spirit and principle of the present disclosure shall be within the scope of the present disclosure.

What is claimed is:

1. A method of controlling a vehicle to perform an operation comprising:

in response to the vehicle turning on an interaction mode according to a music scene, obtaining music information of the music scene, selecting a predetermined song that matches the music information, and generating a control instruction used to control a display device based on the music information, the display device being a holographic projection device; and controlling the display device to perform the operation including displaying a virtual portrait related to the predetermined song, and when the predetermined song is a duet song, controlling the vehicle to allow the virtual portrait to perform the duet song with a voice outside the vehicle.

2. The method according to claim 1, wherein:
the music information includes beat information; and
the method further comprises:
generating the control instruction according to the beat information; and
controlling a vehicle member to perform a corresponding motion according to the beat information based on the control instruction.

3. The method according to claim 2, further comprising:
generating the control instruction according to a beat tempo in the beat information; and
controlling the vehicle member to perform the corresponding motion according to a tempo corresponding to the beat tempo.

4. The method according to claim 2, further comprising:
determining a plurality of beats corresponding to a plurality of time periods from the beat information, the time periods being portions of the predetermined song; and
in response to a first beat of the plurality of beats matching a predetermined beat, controlling the vehicle member to perform the corresponding motion according to the first beat.

5. The method according to claim 1, wherein:
the music information includes a music content; and the method further includes:
performing recognition on the music content and obtaining a recognition result; and
controlling the display device to display a corresponding image according to the recognition result.

6. The method according to claim 5, further comprising:
performing semantic recognition on the music content to obtain a recognized scene semantics; and
controlling the display device to display a corresponding scene image according to the recognized scene semantics consistent with the music content.

7. The method according to claim 5, wherein selecting the predetermined song comprises:
obtaining song information in the music content and matching the song information with a predetermined song library; and
selecting the predetermined song based on the song information and the predetermined song library.

8. The method according to claim 1, wherein:
the vehicle includes at least one of a pair of wipers, a rearview mirror, a wheel, vehicle exterior lights, and vehicle interior ambient lights; and
the method further comprises performing at least one of:
controlling the pair of wipers to swing according to the music information or motion information of an object outside the vehicle, controlling the rearview mirror to open and close according to the music information or the motion information, controlling the wheel to turning according to the music information or the motion information, controlling the vehicle exterior lights to flash according to the music information or the motion information, and controlling the vehicle interior ambient lights to adjust display color of the vehicle interior ambient lights according to the music information.

9. The method according to claim 1, further comprising:
performing recognition on motion information of an object outside the vehicle to obtain a recognition result; and
controlling a vehicle member to perform a corresponding operation according to the recognition result.

10. The method according to claim 9, wherein:
the vehicle member includes a sound generation device; and
controlling the vehicle member to perform the corresponding operation according to the recognition result includes:
controlling the sound generation device to emit a sound to outside of the vehicle according to the recognition result.

11. The method according to claim 1, further comprising:
in response to the vehicle having a first member and at least another vehicle having a second member same as the first member, synchronously transmitting a first instruction using a communication connection between the vehicle and the at least another vehicle to the at least another vehicle; and
controlling the first and second members to perform a same first operation synchronously based on the first instruction.

12. The method according to claim 1, further comprising:
in response to the vehicle having a first member and at least another vehicle having a second member same as the first member, controlling the first and second members to perform a same second operation at different times using a communication connection of the vehicle with the at least another vehicle.

13. The method according to claim 1, further comprising:
in response to the vehicle having a first member different from a second member mounted on at least another vehicle, controlling the first and second members to receive different control instructions using a communication connection of the vehicle with the at least another vehicle; and
based on the different control instructions, controlling the first and second members to perform different operations according to the different control instructions.

14. An electronic apparatus comprising:
at least a processor; and
a memory communicatively coupled to the processor and storing an instruction that, when the instruction is executed by the processor, causes the processor to:
in response to a vehicle turning on an interaction mode according to a music scene, obtain music information of the music scene, select a predetermined song that matches the music information, and generate a control instruction used to control a display device based on the music information, the display device being a holographic projection device outside; and
control the display device to perform an operation including displaying a virtual portrait related to the predetermined song, and when the predetermined song is a duet song, controlling the vehicle to allow the virtual portrait to perform the duet song with a voice outside the vehicle.

15. The electronic apparatus according to claim 14, wherein:
the music information includes beat information; and
the processor is further configured to:
generate the control instruction according to the beat information; and
control a vehicle member to perform a corresponding motion according to the beat information based on the control instruction.

16. The electronic apparatus according to claim 15, wherein the processor is further configured to:
control the vehicle member to perform the corresponding motion according to a tempo corresponding to a beat tempo in the beat information.

17. The electronic apparatus according to claim 15, wherein the processor is further configured to:

determine a plurality of beats corresponding to a plurality of time periods from the beat information, the time periods being portions of the predetermined song; and in response to a first beat of the plurality of beats matching a predetermined beat, controlling the vehicle member to perform the corresponding motion corresponding to the first beat.

18. The electronic apparatus according to claim 14, wherein:

the music information includes a music content; and the processor is further configured to:

perform recognition on the music content and obtain a recognition result; and control the display device to display a corresponding image according to the recognition result.

19. The electronic apparatus according to claim 18, wherein the processor is further configured to:

perform semantic recognition on the music content to obtain a recognized scene semantics; and control the display device to display a corresponding scene image according to the recognized scene semantics consistent with the music content.

20. A non-transitory computer-readable storage medium storing an instruction that, when executed by a machine, causes the machine to:

in response to a vehicle turning on an interaction mode according to a music scene, obtain music information of the music scene, select a predetermined song that matches the music information, and generate a control instruction used to control a display device based on the music information, the display device being a holographic projection device; and control the display device to perform an operation including displaying a virtual portrait related to the predetermined song, and when the predetermined song is a duet song, controlling the vehicle to allow the virtual portrait to perform the duet song with a voice outside the vehicle.

* * * * *